United States Patent [19]

Shimaoka et al.

[11] Patent Number: 4,577,247
[45] Date of Patent: Mar. 18, 1986

[54] RECORDING AND REPRODUCING APPARATUS WITH CARTRIDGE RETAINING MEANS

[75] Inventors: Motohiro Shimaoka; Yukio Saito, both of Furukawa, Japan

[73] Assignee: Alps Electric Co., Ltd., Japan

[21] Appl. No.: 564,305

[22] Filed: Dec. 22, 1983

[30] Foreign Application Priority Data

Dec. 22, 1982 [JP] Japan .............................. 57-193105[U]

[51] Int. Cl.$^4$ ............................................... G11B 5/12
[52] U.S. Cl. ..................................................... 360/97
[58] Field of Search ................. 360/90, 93, 96.1, 96.5, 360/97

[56] References Cited

U.S. PATENT DOCUMENTS 4,257,075 3/1981 Wysocki et al. .................... 360/96.5
4,301,486 11/1981 Brown et al. .......................... 360/99
4,419,703 12/1983 Gruczelak et al. .................... 360/97

Primary Examiner—John H. Wolff
Attorney, Agent, or Firm—Guy W. Shoup

[57] ABSTRACT

A recording and reproducing apparatus comprises a cartridge holder accommodating therein a disk cartridge, a resilient member normally urging the cartridge holder toward a position in which the disk cartridge is dischargeable, and holder means for holding the disk cartridge in position against the cartridge holder to thereby prevent the disk cartridge from popping out against movement of the cartridge holder when the disk cartridge is in the dischargeable position.

7 Claims, 4 Drawing Figures

RECORDING AND REPRODUCING APPARATUS WITH CARTRIDGE RETAINING MEANS

BACKGROUND OF THE INVENTION

The present invention relates to a recording and reproducing apparatus employing disk cartridges as information storage mediums.

There have in the recent past been developed recording and reproducing apparatus for effecting recording and reproducing operation by inserting in a cartridge holder thereof a disk cartridge of a hard material housing a magnetic disk rotatably therein. The disk cartridge is abruptly movable up and down by a resilient member in the recording and reproducing apparatus so that the disk cartridge can be displaced from an unloaded position to a loaded position or vice versa. When the disk cartridge is in the unloaded position, it can be discharged from the body of the recording and reproducing apparatus. If the resilient force with which the disk cartridge can be shifted into the unloaded condition is too large, then the disk cartridge tends to pop out of the apparatus body and be damaged.

SUMMARY OF THE INVENTION

It is an object of the present invention to provide a recording and reproducing apparatus which will eliminate the foregoing conventional problem and has means for preventing a disk cartridge from poping out accidentally.

According to the present invention, there is provided a recording and reproducing apparatus comprising a cartridge holder accommodating therein a disk cartridge, a resilient member normally urging the cartridge holder toward a position in which the disk cartridge is dischargeable, and holder means for holding the disk cartridge in position against the cartridge holder to thereby prevent the disk cartridge from popping out against movement of the cartridge holder when the disk cartridge is in the dischargeable position.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
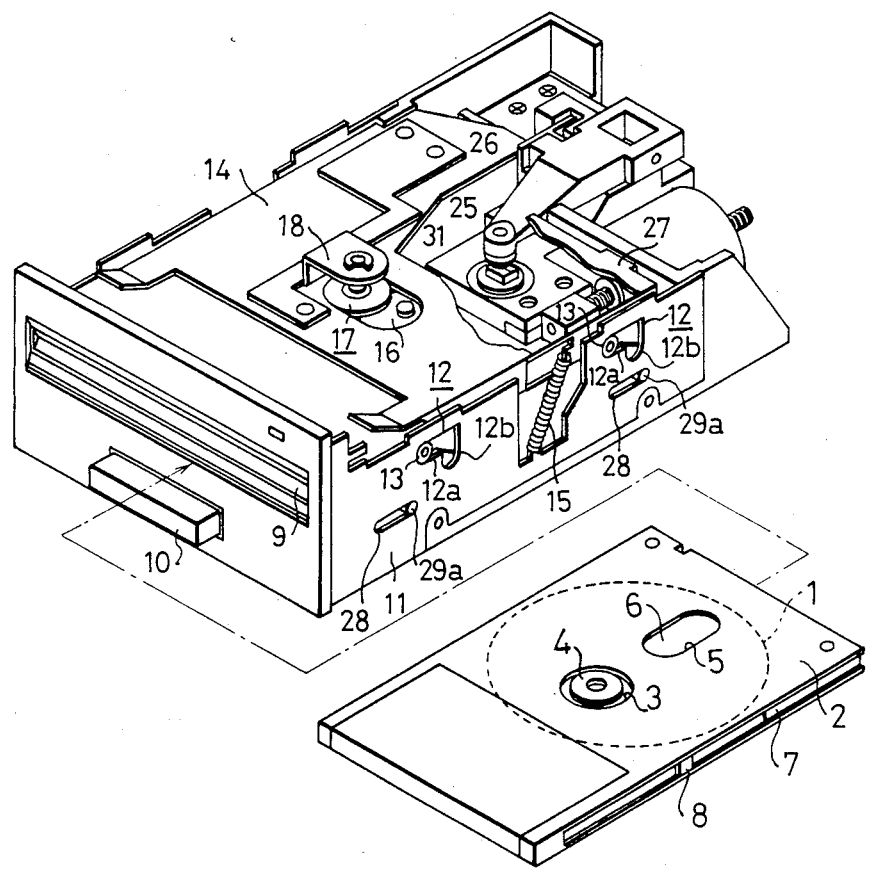
FIG. 1 is a perspective view of a recording and reproducing apparatus of the present invention, together with a disk cartridge for use therein.

As shown in FIG. 1, a magnetic disk 1 is rotatably housed in a disk cartridge 2 made of hard synthetic resin and has a central hub 4 projecting through a central hole 3 in the disk cartridge 2. The disk cartridge 2 has a magnetic head insertion slot 5 defined therein and a shutter 6 of metal disposed below the magnetic head insertion slot 5. The disk cartridge 2 has grooves 7 defined in side edges thereof, there being a shutter actuator 8 slidably disposed in one of the grooves 7 for actuating the shutter 6.

Figure 2:
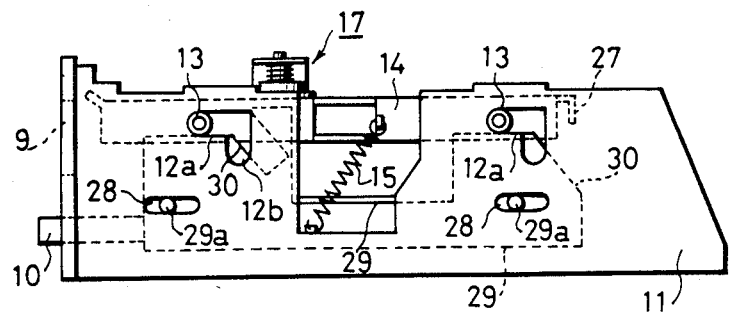
FIG. 2 is a side elevational view of the recording and reproducing apparatus of FIG. 1, showing an unloaded position.

A recording and reproducing apparatus includes a body 11 having a cartridge insertion hole 9 and an eject button 10 in a front frame member. A cartridge holder 14 is disposed in the body 11 and has rollers 13 mounted on sides thereof and guided respectively in hook-shaped holes 12 defined in respective sides of of the body 11. The cartridge holder 14 is normally urged by a resilient member 15 such as a tension spring to move toward a front frame member and in a downward direction in the body 11, the resilient member 15 acting between the cartridge holder 14 and the body 11. When the disk cartridge 2 is not inserted in the body 11, as shown in FIG. 2, the rollers 13 are positioned at front ends of horizontal portions 12a of the hook-shaped holes 12 under the bias of the resilient member 15.

Figure 4:
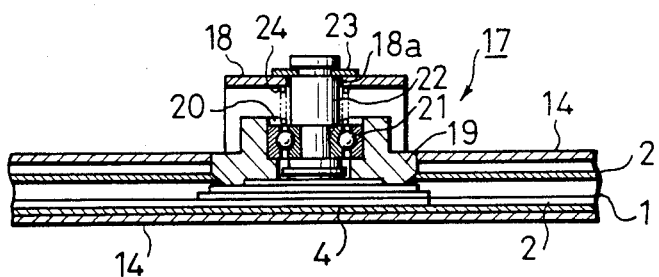
FIG. 4 is an enlarged fragmentary cross-sectional view of a holder means.

As illustrated in FIG. 1, the cartridge holder 14 has on its front upper portion a support 18 for a holder means 17 for pressing the hub 4 of the magnetic disk 1 toward a turntable 16 to position the disk cartridge 2 in the cartridge holder 14. As shown in FIG. 4, the holder means 17 is composed of a presser 19 of hard synthetic resin having a recessed cross-sectional shape, a small bearing 21 disposed in a central aperture 20 in the presser 19, a shaft 22 fitted in a central bore in the small bearing 21, a retaining ring 23 which retains an upper end of the shaft 22 on the bearing 18, and a compression spring 24 interposed between the support 18 and the small bearing 21. The holder means 17 is vertically movable against the force of the compression spring 24 and swingable through an angular interval allowed by a gap or clearance formed around the shaft 22 in a hole 18a in the support 18.

The cartridge holder 14 also has on its rear upper portion an abutment disposed in confronting relation to a magnetic head 31 for lifting an arm 26 with a pad 25 when the rollers 13 on the cartridge holder 14 are located in the horizontal portions 12a of the hook-shaped holes 12. The cartridge holder 14 has a bent portion 27 projecting from a rear end thereof for abutting against a front end of the cartridge 2.

To the eject button 10 is connected a lifting cam 29 having on a side thereof a pin 29a guided in a horizontal slot 28 defined in one of the sides of the body 11. The cam 29 has lifting slant edges 30 engageable with the rollers 13 in vertical portions 12b of the hook-shaped holes 12.

Figure 3:
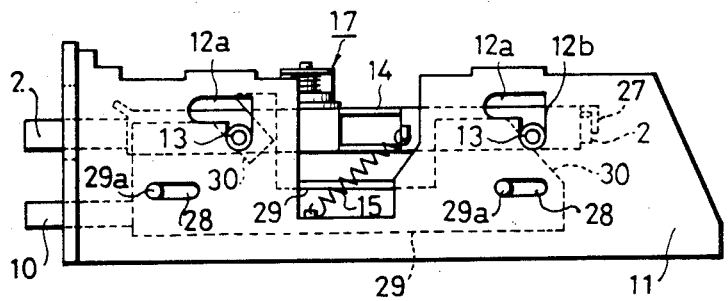
FIG. 3 is a view similar to FIG. 2, showing a loaded position.

When the disk cartridge 2 is inserted through the insertion hole 9 into the cartridge holder 14, the presser 19 of the holder means 17 is pressed to move upwardly by an upper surface of the disk cartridge 2 as the latter advances. The presser 19 is angularly moved about its own axis by the small bearing 21, or swings with the shaft 22 while the presser 19 is being held resiliently against the upper surface of the cartridge 2. When the presser 19 reaches the hole 3 in the cartridge 2, the presser 19 is lowered under the resiliency of the compression spring 24 to press the hub 4 downwardly in the hole 3. The disk cartridge 2 is depressed into a lower portion of the cartridge holder 14 by the presser 19, and hence is held in position within the cartridge holder 14. At the same time that the disk cartridge 2 is held down by the presser 19, the front edge of the cartridge 2 pushes the bent portion 27 of the cartridge holder 14 to move the latter to the right (FIGS. 2 and 3), thus causing the rollers 13 to be displaced from the horizontal portions 12a of the holes 12 toward lower ends of the vertical portions 12b thereof. At this time, the rollers 13 are abruptly moved downwardly in the vertical portions 12b under the resilient force of the resilient member 15, so that the cartridge holder 14 is also depressed simultaneously into a loaded position. Then, the hub 4 of the magnetic disk 1 is pressed by the presser 17 toward the turntable 16, whereupon the magnetic disk 1 is rendered rotatable.

The magnetic head insertion slot 5 is now open with the shutter 6 actuated by a pin (not shown) disposed adjacent to the cartridge insertion hole 9. Depression of the cartridge holder 14 causes the pad 25 on the arm 26 to move downwardly until the magnetic disk 1 is held against the magnetic head 31. The recording and reproducing apparatus is ready for recording signals on the magnetic disk 1 or reproducing signals therefrom through the magnetic head 31.

When the cartridge holder 14 is to be brought from the loaded position to an unloaded position, the eject button 10 is pushed in to enable the slant edges 30 of the cam 29 to raise the rollers 13 from the lower ends of the vertical portions 12b of the hook-shaped holes 12. The rollers 13 are lifted as they are clamped between the slant edges 30 and the rear edges of the vertical portions 12b of the hook-shaped holes 12. When the rollers 13 reach the horizontal portions 12a, the rollers 13 are disengaged from the slant edges 30. The rollers 13 are now abruptly displaced toward the front ends of the horizontal portions 12a under the force of the resilient member 15. Concurrent with this movement of the rollers 13, the cartridge holder 14 is quickly moved upwardly and toward the cartridge insertion hole 9 into a position prior to loading. Since the disk cartridge 2 is held in position by being pressed down by the cartridge holder 14 through the presser 19 of the holder means 17, the disk cartridge 2 is prevented from popping out of the body 11.

With the foregoing arrangement, the disk cartridge is held in position in the cartridge holder by the holder means, and is prevented from accidentally popping out of the apparatus body and also from being damaged.

Although a certain preferred embodiment has been shown and described, it should be understood that many changes and modifications may be made therein without departing from the scope of the appended claims.

What is claimed is:

1. A recording and reproducing apparatus comprising:
    a cartridge holder adapted to accomodate a disk cartridge inserted therein, said cartridge holder being movable in said apparatus between unloaded and loaded positions;
    a resilient member for normally biasing said cartridge holder toward the unloaded position from which the disk cartridge is dischargeable from the apparatus, said cartridge holder being movable to the loaded position against the biasing force of said resilient member; and
    holder means mounted to said cartridge holder for pressing the disk cartridge against a portion of said cartridge holder to thereby prevent the disk cartridge from popping out when said cartridge holder is moved from the loaded to the unloaded position by the force of said resilient member, said holder means comprising a support mounted to a portion of said cartridge holder, a shaft supported in said support, and a presser movably supported on said shaft and biased in a direction for pressing against the disk cartridge inserted in said cartridge holder.

2. A recording and reprducing apparatus according to claim 1, wherein said cartridge holder is oriented horizontally in said apparatus and has an upper portion spaced from a lower portion for accomodating the disk cartridge therebetween, and said holder means is disposed on said upper portion of said cartridge holder with said presser biased in a downward direction toward a hub portion of the disk cartridge so as to press said hub for driving contact with a rotating means of the apparatus in the loaded position.

3. A recording and reproducing apparatus according to claim 1, wherein said cartridge holder has a support, said holder means comprising a presser having a recessed cross section, a bearing fixed in a central hole in said presser, a shaft fitted in a central bore in said bearing, a retaining ring locking an upper end of said shaft on said support, and a compression spring interposed between said support and said bearing.

4. A recording and reproducing apparatus according to claim 3, wherein said support has a hole providing a clearance around said shaft.

5. A recording and reproducing apparatus according to claim 1, including a body accommodating therein said cartridge holder and having hook-shaped holes, said cartridge holder being guided by said hook-shaped holes for movement between loaded and unloaded positions.

6. A recording and reproducing apparatus according to claim 1 wherein said resilient member comprises a tension spring.

7. A recording and reproducing apparatus according to claim 6, including a body accommodating therein said cartridge holder, said tension spring acting between said body and said cartridge holder.

* * * * *